April 19, 1966  P. W. SWEETSER  3,246,675

SAW TABLES

Filed Jan. 15, 1963

Inventor:
Phillip W. Sweetser,
by Abbott Spear,
Attorney

United States Patent Office 3,246,675
Patented Apr. 19, 1966

3,246,675
SAW TABLES
Phillip W. Sweetser, Farmington, Maine
Filed Jan. 15, 1963, Ser. No. 251,640
7 Claims. (Cl. 143—132)

The present invention relates to saw tables and particularly to saw tables having a discharge for cut pieces of stock of lengths less than a predetermined minimum.

In the use of saw tables in the production of pieces of a length within a predetermined range, there are usually a number of shorter pieces of stock formed which must be removed and the principal objective of the present invention is to provide a saw table discharging such short pieces as they are cut thus to expedite the handling of those that are acceptable as to length.

This general objective is attained by providing the saw table top with first and second laterally spaced openings with the first opening being in the form of a saw blade slot and the second opening being relatively long with the top between the openings being a relatively narrow, work supporting web. Cut stock remains on the table if of such a length as to span the second opening; shorter stock falls through the discharge defined thereby.

In practice, the length of the second opening is adjustable and in practice, a part of the table top is slidable towards and away from the saw blade slot to provide an adjustable support. The slidable support is desirably carried by the fence and is preferably adjustable relative thereto towards and away from the saw blade slot thus to vary its supporting area.

In the accompanying drawings, there is shown an embodiment of the invention illustrating these and other of its objectives, novel features, and advantages.

Figure 1:
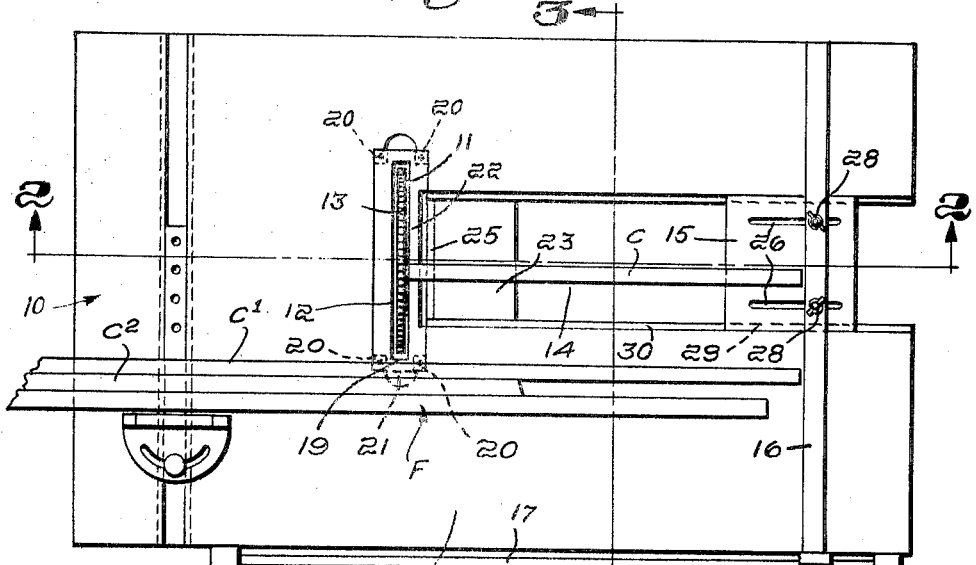
FIGURE 1 is a top plan view of a saw table in accordance with the invention.
Figure 2:
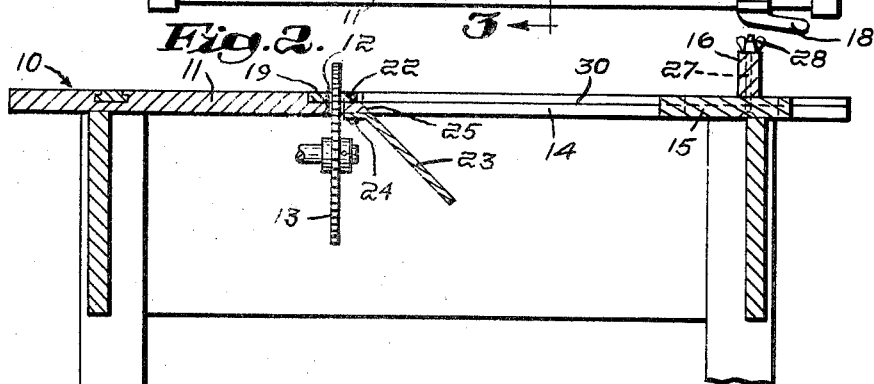
FIGURE 2 is a section taken approximately along the indicated lines 2—2 of FIGURE 1, but with inserts added to cover the discharge.
Figure 3:
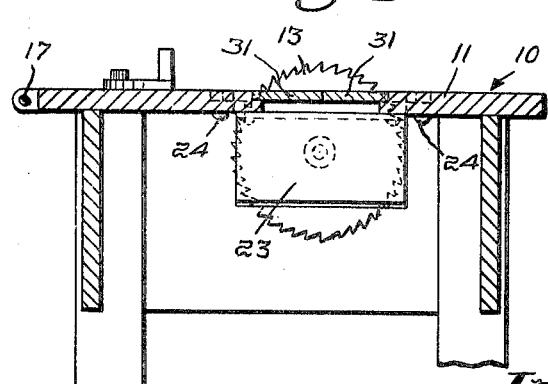
FIGURE 3 is a section, on a decreased scale, taken approximately along the indicated lines 3—3 of FIGURE 1, but with inserts added to cover the discharge.

A saw table in accordance with the invention is generally indicated at 10 and is shown as having its top 11 provided with a slot 12 for a circular saw blade 13 and an opening 14 in which there is a support 15 attached to a fence 16. The fence 16 is parallel to the slot 12 and is adjustable towards or away from the saw blade 13 as is desired by the operator. While such adjustability of the fence may be effected in any desired way, the fence 16 is shown as slidably supported by a rod 17 to which it is locked in a selected position as by the generally indicated clamp 18.

In practice, the slot 12 is formed in an insert 19 supported in the inner end of the opening 14 as by inwardly disposed shoulders 20, and the table top is channelled as at 21 to enable the insert 19 to be easily lifted and removed in the event the saw blade 13 is to be removed and replaced. An important function of the insert 19 is to provide a narrow web 22 between the saw blade 13 and the support 15.

Stock long enough to span, when cut, the space between the web 22 and the support 15 remains on the table top 11 while shorter pieces fall through the discharge defined by the opening 14. In practice, a chute 23 is attached to the undersurface of the table top 11 as by screws 24 under the downwardly and outwardly inclined margin 25 of the web 22.

In use, a number of pieces are cut together and those that are to remain on the table may range between substantial limits. For that reason, the support 15 has parallel slots 26 for bolts 27 extending upwardly through the fence and secured in place as by wing nuts 28 so that it may be adjusted relative to the fence 16 towards or away from the saw table thus to increase or decrease the area of the support 15.

It is preferred that margins of the support 15 be undercut to provide shoulders 29 engageable with supporting shoulders 30 marginally of the opening 14. If desired, the table top may be provided with a plurality of inserts 31 which may be used to close the discharge opening 14 and these may also serve as a means for varying the width of the discharge.

In practice, a saw table in accordance with the invention has a number of advantages in use as, for example, if a number of pieces of lumber have to have their ends cut square and then cut to a desired length and with knots or other imperfections cut therefrom. In that case, several pieces of lumber can be placed on the table 11 and their ends cut square. The end trimmings are usually short and they drop through the opening 14 to waste, keeping the table free of unwanted pieces.

The guide fence 16 is used, for example, when the end of the stock has been cut square and a predetermined length is wanted. For example, the piece C has been cut to length with its previously established square end against the guide fence 16 and it is supported by the support 15 and the web 22. The piece $C^1$ is ready to be cut to length. The piece $C^2$ has to have its end cut either because its end is not square or because it contains a flaw. The piece $C^3$ has a flaw F but is long enough to be salvable and accordingly remains on the table with the pieces of desired length. The adjustability of the support 15 relative to the guide fence 16 enables the salvable lengths to be varied.

I claim:

1. In a saw table, a top having first and second laterally spaced and aligned openings, the first opening being in the form of a slot through which the upper portion of a circular saw blade is to be exposed when in use, the second opening being in the form of a relatively long discharge, and the top between the openings being a relatively narrow, work supporting web whereby cut stock remains on the table if of such a length as to span the second opening, shorter stock falling through said discharge as it is cut.

2. In a saw table, a top having first and second laterally spaced and alined openings, the first opening being in the form of a slot through which the upper portion of a circular saw blade is to be exposed when in use, the second opening being in the form of a relatively long discharge, the top between the openings being a relatively narrow, work supporting web whereby cut stock remains on the table if of such a length as to span the second opening, shorter stock falling through said discharge as it is cut, said top including a portion at the side of said second opening opposite said web, said portion being adjustable towards and away from said web.

3. In a saw table, a top having first and second laterally spaced and alined openings, the first opening being in the form of a slot through which the upper portion of a circular saw blade is to be exposed when in use, the second opening constituting a discharge, the top between the openings being a relatively narrow, work supporting web, and a support slidable in said second opening to establish a desired length thereof with cut stock remaining on the table if of a length to span said second opening, shorter stock falling through said discharge as it is cut.

4. In a saw table, a top having first and second laterally spaced and alined openings, the first opening being in the form of a slot through which the upper portion of a circular saw blade is to be exposed when in use, a fence on said top parallel to said slot and adjustable relative thereto, the second opening constituting a discharge, the top between the openings being a relatively narrow, work supporting web, and a support slidable in said second opening and carried by said fence to establish a desired length thereof with cut stock remaining on the table if of a length to span said second opening, shorter stock falling through said discharge as it is cut.

5. In a saw table, a top having first and second laterally spaced and alined openings, the first opening being in the form of a slot through which the upper portion of a circular saw blade is to be exposed when in use, a fence on said top parallel to said slot and adjustable relative thereto, the second opening extending through a side of said top and constituting a discharge, the top between the openings being a relatively narrow, work supporting web, and a support slidable in said second opening and carried by said fence to establish a desired width thereof with cut stock remaining on the table if of a length to span said second opening, shorter stock falling through said discharge as it is cut, said support being adjustable relative to said fence lengthwise of said second opening.

6. In a saw table, a top having a transverse opening, said top including supporting means marginally of said opening, an insert having a slot through which the upper portion of a circular saw blade is to be exposed when in use, the axis of the saw blade being lengthwise of said opening, said insert being supported by said means and partially closing said opening, the remainder of said opening being a relatively wide discharge, and the insert between the slot and the discharge being a relatively narrow, work supporting web whereby cut stock remains on the table if of such a length as to span the opening, shorter stock falling through said discharge.

7. In a saw table, a top having first and second laterally spaced and alined openings, the first opening being in the form of a slot through which the upper portion of a circular saw blade is to be exposed when in use, the second opening extending through a side of said top and constituting a discharge, said top including supporting means marginally of said second opening, the top between the openings being relatively narrow, work supporting web, and a support slidable in said second opening to establish a desired width thereof with cut stock remaining on the table if of a length to span said second opening, shorter stock falling through said discharge as it is cut, and an insert closing said second opening and supported by said means, said insert comprising a plurality of separate, marginally abutting sections extending lengthwise of said second opening.

References Cited by the Examiner

UNITED STATES PATENTS

| | | | |
|---|---|---|---|
| 378,796 | 2/1888 | Linderman | 209—85 |
| 921,723 | 5/1909 | Miller | 143—52 |
| 1,245,584 | 11/1917 | Hallock | 143—157 |
| 1,593,317 | 7/1926 | Thomes | 144—1 |
| 1,907,564 | 5/1933 | Osborn et al. | 143—157 |
| 2,613,699 | 10/1952 | Dudek | 143—49 |
| 2,662,640 | 12/1953 | Dedo | 143—157 |

WILLIAM W. DYER, JR., *Primary Examiner.*

LEON PEAR, *Examiner.*

G. A. DOST, *Assistant Examiner.*